United States Patent [19]
Goeckner et al.

[11] Patent Number: 5,165,307
[45] Date of Patent: Nov. 24, 1992

[54] TRANSMISSION CONTROLLER

[75] Inventors: Victor D. Goeckner, Auburn; Ronald W. Steffen, Springfield, both of Ill.

[73] Assignee: Dickey-john Corporation, Auburn, Ill.

[21] Appl. No.: 515,053

[22] Filed: Apr. 26, 1990

[51] Int. Cl.$^5$ .................. B60K 41/06; B60K 20/10
[52] U.S. Cl. .................................. 74/866; 364/424.1
[58] Field of Search ............... 364/424.1; 74/866, 861

[56] References Cited

U.S. PATENT DOCUMENTS

| | | | |
|---|---|---|---|
| 4,335,428 | 6/1982 | Miki et al. | 364/424.1 |
| 4,517,646 | 5/1985 | Magnusson et al. | 364/424.1 |
| 4,539,868 | 9/1985 | Habu | 74/866 X |
| 4,648,290 | 3/1987 | Dunkley et al. | 364/424.1 X |
| 4,732,055 | 3/1988 | Tateno et al. | 364/424.1 X |
| 4,853,673 | 8/1989 | Kido et al. | 364/424.1 X |
| 4,905,544 | 3/1990 | Ganoung | 74/866 |
| 4,930,374 | 6/1990 | Simonyi et al. | 74/866 |
| 4,933,859 | 6/1990 | Tsuyama et al. | 364/424.1 X |
| 4,937,749 | 6/1990 | Dunkley et al. | 74/866 X |

Primary Examiner—Leslie A. Braun
Assistant Examiner—Khoi Q. Ta
Attorney, Agent, or Firm—Leydig, Voit & Mayer

[57] ABSTRACT

A transmission controller is provided for use with a vehicle having a transmission including a plurality of gears. The transmission controller comprises an automatic gear selection control for developing control signals for controlling automatic selection of one of the plurality of gears. A throttle position sensor produces a throttle position signal corresponding to the position of a manually operated throttle of the vehicle, and an engine sensor produces rpm signals corresponding to the engine speed of an engine of the vehicle. The automatic gear selection control includes a control signal producing circuit responsive to the throttle position signals and to the rpm signals for producing signals for controlling the selection of a lower gear in the event the sensed engine speed comprises less than a preselected percentage of a predetermined no-load engine speed at the sensed throttle position.

2 Claims, 5 Drawing Sheets

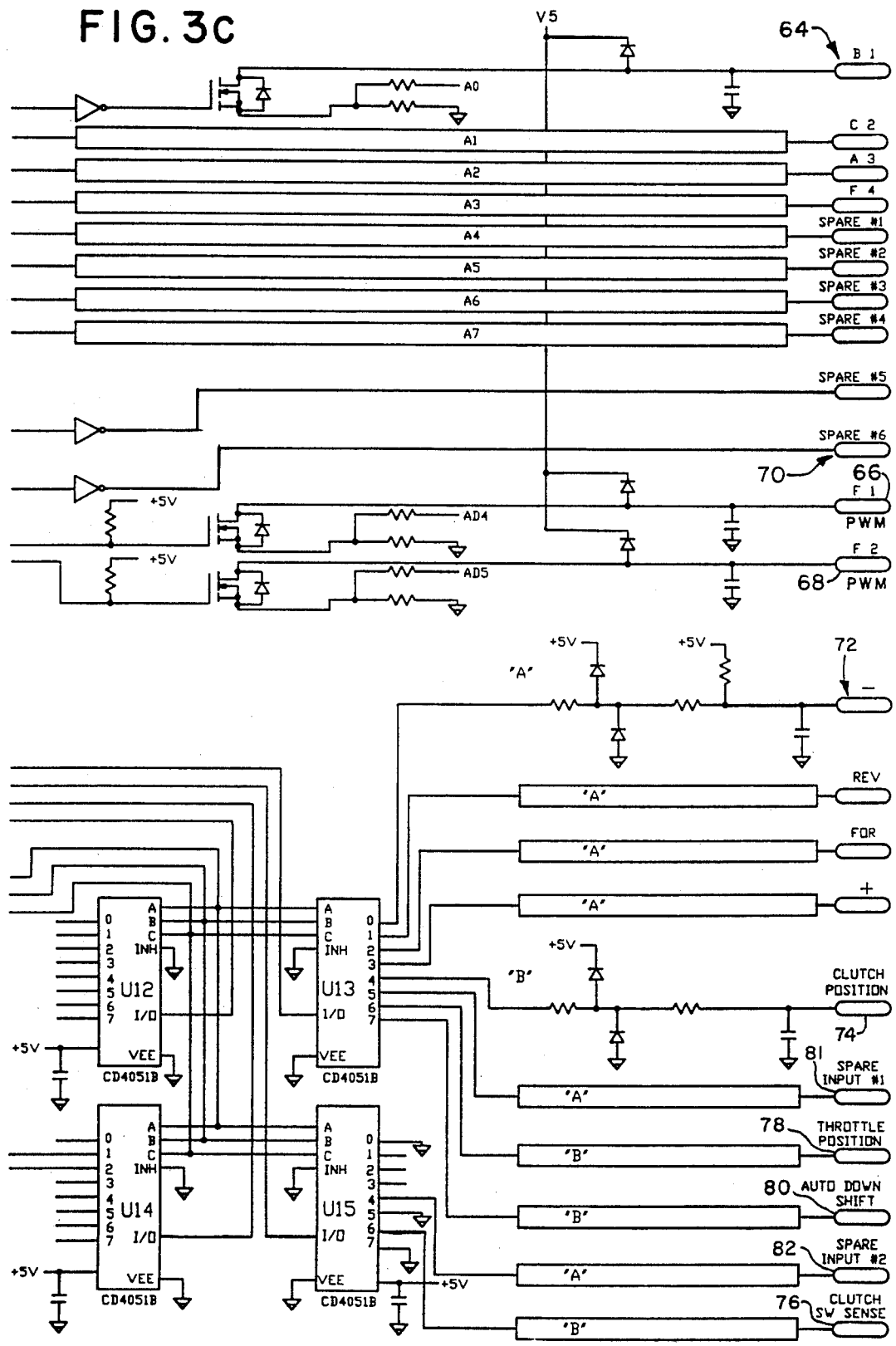

TRANSMISSION CONTROLLER

BACKGROUND OF THE INVENTION

This invention is directed generally to transmission controllers, and more particularly to an automated transmission control system which automatically downshifts the associated transmission when engine rpm falls below an operator selectable threshold value for a given throttle position.

In relatively large on-the-road or off-the-road vehicles, relatively complex transmissions are required. Large heavy construction equipment, farm tractors and the like, generally employ transmissions which provide for multiple gears in both forward and reverse directions. Such multiple gearing systems commonly require multiple gear shift levers, multiple clutches, and corresponding operator controls for manual operation thereof. In addition, many such vehicles such as tractors, road construction or other construction equipment, etc., often require numerous other operator controls for controlling various accessories, such as blades, backhoes, buckets, farm implements, and the like.

Accordingly, it has been heretofore proposed to provide automated or partially automated transmission control systems for simplifying the manual operation of the vehicle transmission. Such control systems may employ solenoid operated valves for operating the clutches of the transmission to free the operator from foot-pedal-operated or otherwise operator-actuated clutches. Such controls may also incorporate simplified shift levers which electrically or electro-hydraulically operate corresponding clutches and other mechanical components for engaging the desired gears without cumbersome manual operation of large heavy gear shift levers or the like by the operator.

Such control systems require relatively sophisticated electronic control arrangements for properly integrating the disengagement and reengagement of clutches and the selection of gears in the proper sequence and with the proper timing to assure smooth shifting of the transmission through both forward and reverse gears, and also from forward to reverse gears or vice versa, as may be desired in operation. It should be noted in this regard that such shifting is not always between adjacent gears.

One problem that has heretofore arisen in such transmissions is the problem of obtaining a smooth operation of the vehicle when engine rpm decreases suddenly during operation. This sudden decrease may be due to a sudden load increase, or a sudden incline, or the like. Normally, such conditions require operator intervention, usually by way of downshifting the transmission.

Accordingly, we have proposed an automatic downshifting system in which the relationship between engine rpm and throttle position is automatically determined and used to downshift the transmission at an operator selectable value of engine rpm. This will result in smoother, more reliable vehicle operation.

OBJECTS AND SUMMARY OF THE INVENTION

It is an object of the invention to provide a novel and improved transmission controller which provides for automatic downshifting of the transmission.

Briefly, and in accordance with the foregoing discussion, the present invention provides a transmission controller for use with a vehicle having a transmission including a plurality of gears, said transmission controller comprising automatic gear selector control means for developing control signals for controlling automatic selection of one of said plurality of gears, throttle position sensing means for producing a throttle position signal corresponding to the position of a manually operated throttle of said vehicle, and engine sensor means for producing rpm signals corresponding to the engine speed of an engine of said vehicle, and wherein said automatic gear selection control means includes control signal producing means responsive to the throttle position signals and to the rpm signals for producing signals for controlling the selection of a lower gear in the event the sensed engine speed comprises less than a preselected percentage of a predetermined no-load engine speed at the sensed throttle position.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawings in which like reference numerals identify like elements, and in which:

FIGS. 3A, 3B and 3C together form a schematic circuit diagram of the transmission control module of the system of FIG. 1; and FIG. 4 is a schematic circuit diagram of a power supply circuit for the circuit of FIG. 3.

DETAILED DESCRIPTION OF THE ILLUSTRATED EMBODIMENT

Figure 1:
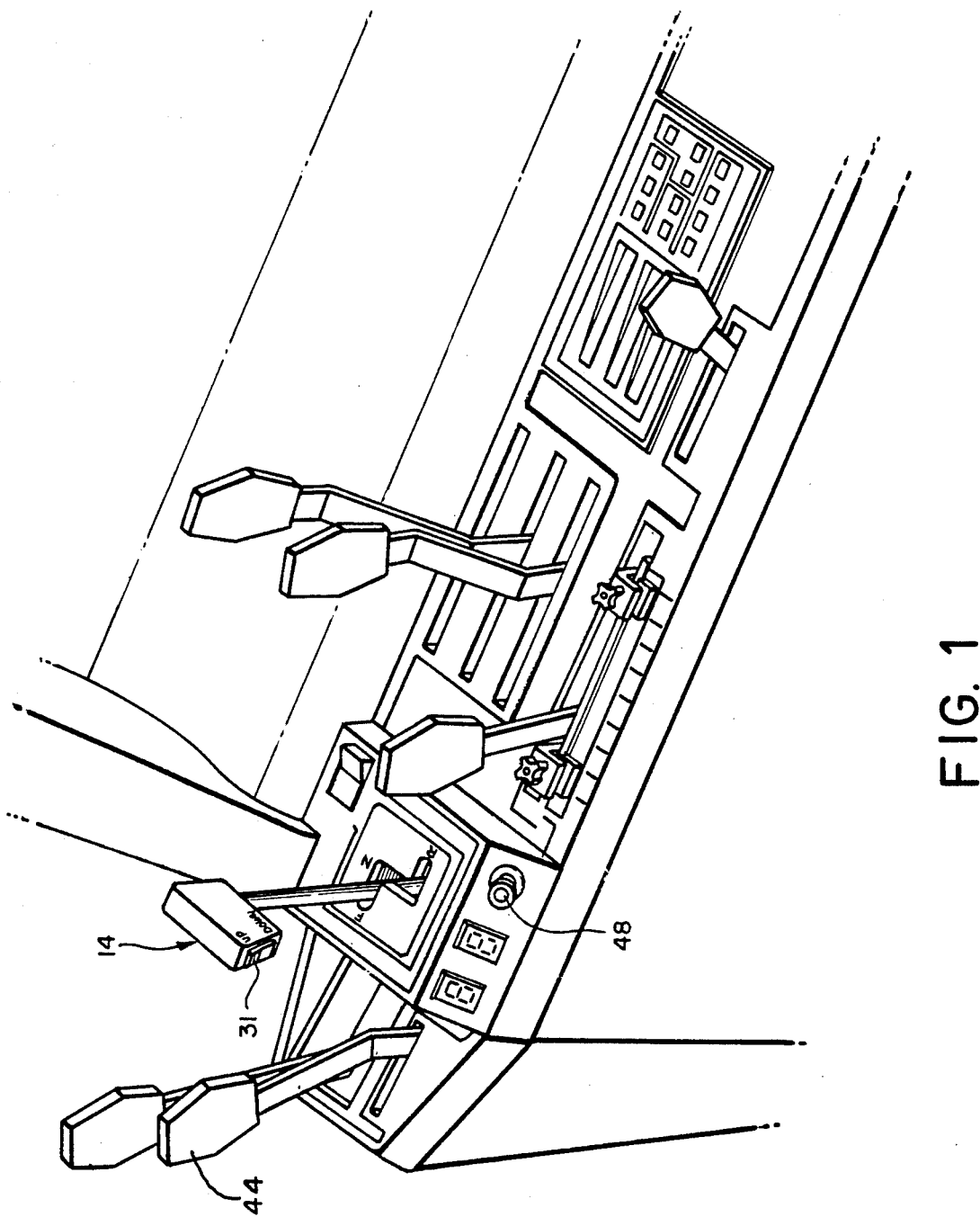
FIG. 1 is a perspective view of a gear shift and related control panel of a vehicle, with which the invention may be utilized.

Referring now to the drawings, and initially to FIG. 1, there is illustrated an example of a vehicle control panel including gearshift levers and the like, and in connection with which a transmission controller in accordance with the invention may be advantageously utilized. The transmission controller 10 of the invention is illustrated in block diagrammatic form in FIG. 2 in association with the transmission system of a relatively large vehicle, such as an agricultural tractor or the like, also illustrated somewhat diagrammatically. Certain of the control elements of FIG. 1 are also shown in FIG. 2 in operative association with controller 10.

Figure 2:
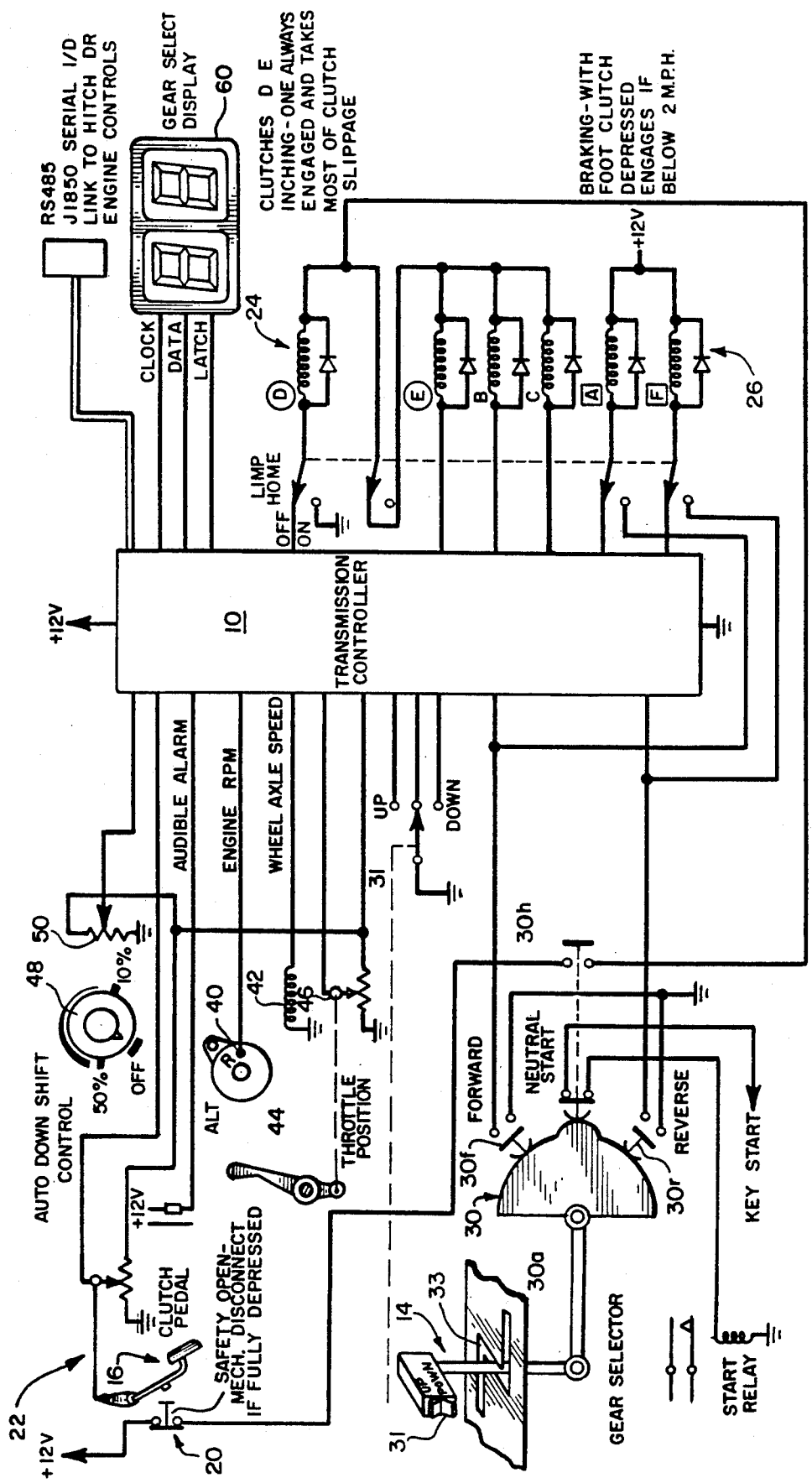
FIG. 2 is a block diagrammatic representation of a transmission control system in accordance with the present invention.

Generally speaking, the transmission system as shown in FIG. 2 includes a plurality of gears (not shown) which are shifted by the controller in response to operation of a gear shift lever 14. Also shown is a representative clutch or "inching" pedal 16. clutches or clutch pedals 16. The representative clutch pedal 16 is illustrated in FIG. 2, in connection with a safety disconnect switch component 20 for detecting when the clutch is in a fully depressed condition. A clutch position sensing arrangement 22 comprises a potentiometer for determining the relative position of the clutch pedal between a fully in, or disengaged, and a fully out or engaged position; that is, the "working range" of the clutch.

One or more valve-operated clutches are also provided in the vehicle with which the transmission controller of the invention is advantageously utilized. Accordingly, the control system also includes one or more corresponding solenoid operated valves, which are indicated diagrammatically in FIG. 1 by their associated solenoid coils 24 and 26.

The gear shift 14 is preferably of the general type in which a shift pattern is reproduced electrically in the form of a cam-operated switching arrangement generally designated by reference numeral 30. Respective switching lines for forward, reverse, neutral-start and an up-and-down switch 31 carried on shift lever 14 form a digital logical representation which the transmission controller 10 can readily interpret to determine the positions of a joystick-type control member in a shift pattern 33 of the gear shift mechanism and of the switch 31. In the illustrated embodiment, there may be as many as ten possible variations or subcombinations of portions of lever 14 and switch 31. Of course fewer or more such variations, or an alternate form of shift pattern or variation, might be utilized without departing from the invention.

Other elements of the transmission and related tractor systems and components illustrated in FIG. 2 include a sensor 40 for developing an rpm signal corresponding to an engine speed (rpm) and a ground speed sensor, here diagrammatically illustrated as a coil 42. The sensor 42 senses wheel axle speed and develops a corresponding signal, which will be understood to be an analog of the ground speed of the vehicle.

A throttle position sensor 46 is mechanically coupled with the throttle 44 and preferably comprises a variable resistor or potentiometer for developing an electrical signal corresponding to the position of the throttle 44. Finally, an auto downshift control member or dial 48 is provided for operator setting for a desired percentage of no-load engine speed at a given throttle position at which downshifting is to occur in accordance with the invention. The position of this dial or control 48 is effectively sensed and converted to a corresponding signal by a potentiometer 50 which is mechanically coupled to the dial 48.

Details of the transmission controller 10 are illustrated in FIG. 3, to which reference is next invited. It will be noted that in the diagram of FIG. 3, certain of the circuit configurations have been repeated in the figure, whereby those circuits identical in form with circuit configurations fully illustrated thereabove have been illustrated in block and labeled to indicate that the contents of these "blocks" are circuits identical with like-designated circuits illustrated thereabove.

A display 60 gives information (preferably numeric) identifying the gear actually engaged, when the gear selector 14 is moved to the "forward" position 30. When the gear selector 14 is in the neutral position, display 60 identifies the gear that will be engaged by operation of the controller when the selector is moved to the forward position.

Referring briefly to FIG. 3C, a plurality of outputs are provided as indicated generally by reference numeral 64. These include outputs for delivering a pulse width modulated (PWM) current to the respective solenoid coils 24, 26 for the solenoid valve operated clutches. These are indicated at reference numerals 66 and 68 (F1-PWM and F2-PWM). A number of spare outputs are indicated generally by reference numeral 70.

A plurality of additional inputs indicated generally at reference numeral 72, also in FIG. 3C, include inputs for the respective forward (FOR), and reverse (REV), up (+) and down (−) sensors or switches associated with joystick 14 and switch 31. The clutch position sensor 22, and the clutch pedal depressed sensor 20 are coupled at inputs 74 and 76. Inputs 78 and 80 are provided for the throttle position sensor 46 and the auto downshift control sensor 50. Spare inputs 81, 82 are also provided.

While a great number of control features can be and preferably are provided in connection with the illustrated transmission controller, the present invention is concerned primarily with the automatic downshifting feature mentioned hereinabove. Preferably, the controller of the invention will automatically downshift the transmission when the engine rpm falls below a predetermined percentage of the no-load rpm for a given throttle setting, which percentage is selectable at the auto downshift control dial 48 by the operator.

Figures 3A, 4:
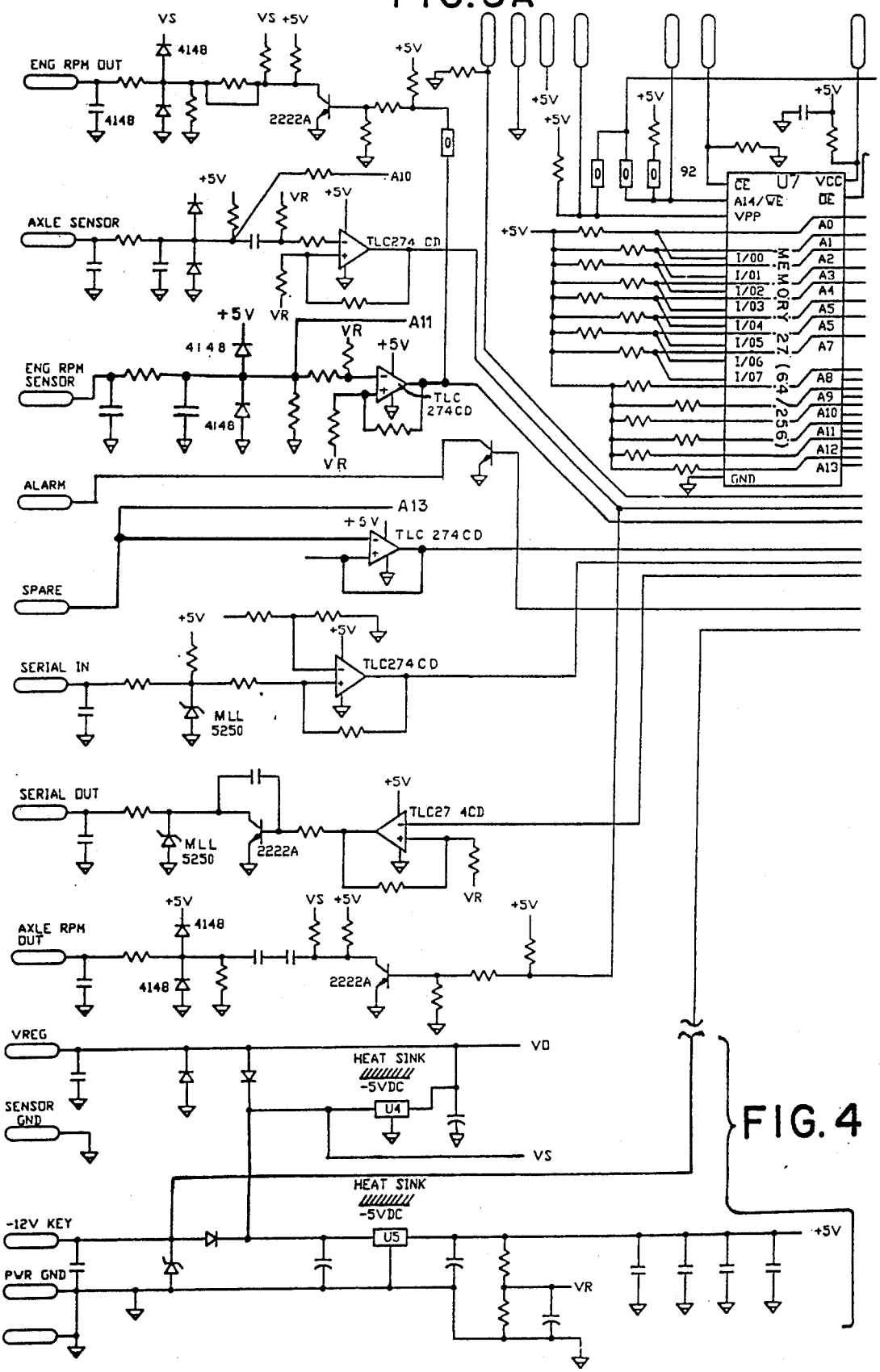
Figure 3B:
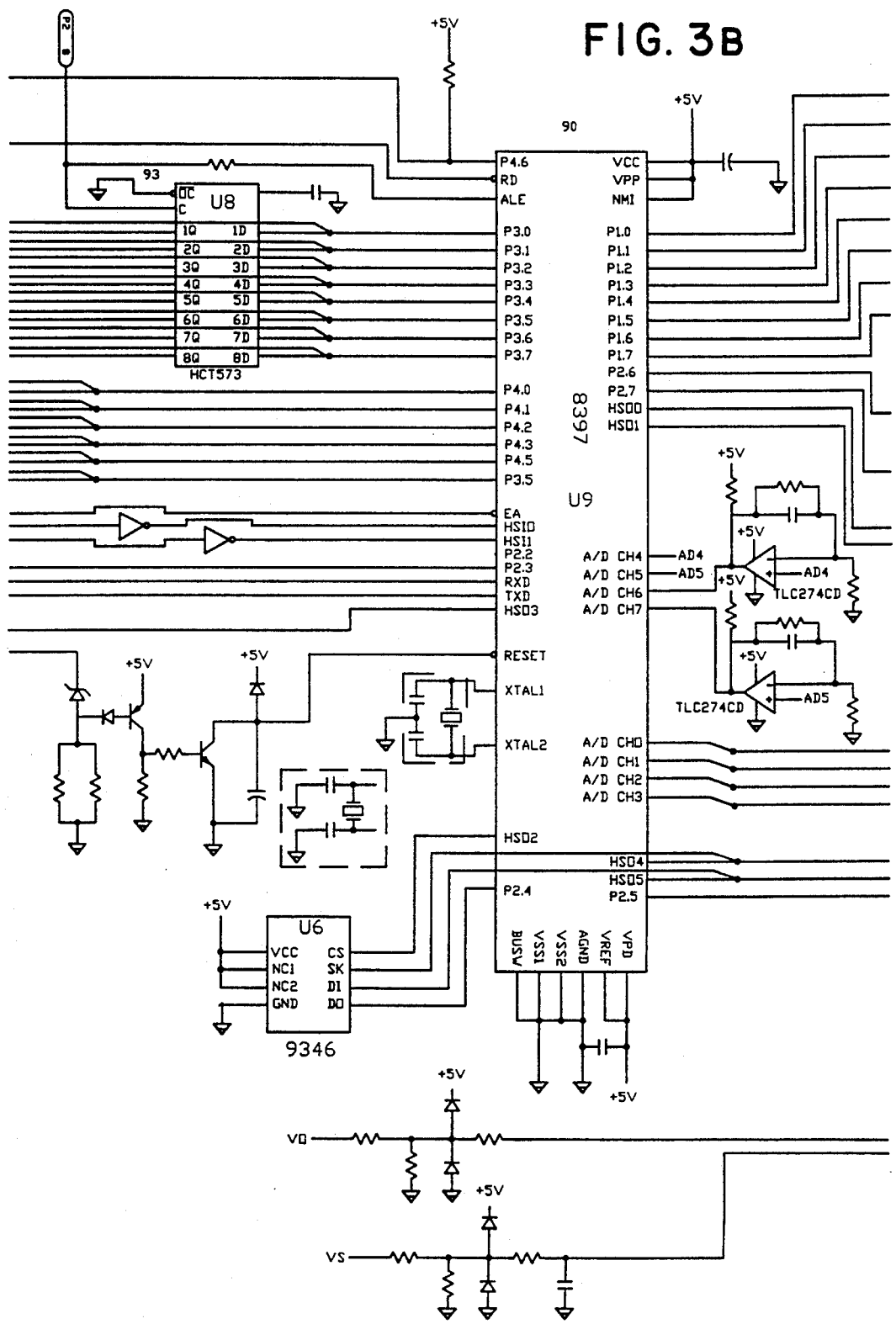

Accordingly, and as best viewed in FIG. 3B, The controller 10 includes a microcomputer or microprocessor 90, preferably of the type generally designated 8397. The microcomputer 90 has a plurality of input and output ports which are coupled with the inputs and outputs mentioned above by way of suitable intervening circuits. The microcomputer 90 may have suitable on-board memory, and additional outboard memory may be provided in the form of memory components 92, 93 as indicated in FIGS. 3A and 3B. Together, these memory elements form memory means for retaining predetermined information, including information corresponding to the above-mentioned sensor signals.

In accordance with the invention, the microcomputer or microprocessor 90 comprises control means for the control of automatic gear selection means. The automatic gear selection means are operated by control signals produced at the outputs indicated generally at reference numeral 64 and referred to hereinabove. Accordingly the processor means is responsive to the throttle position signals produced by the throttle position sensing means and to rpm or engine speed signals produced by the engine sensor means for producing signals for controlling the selection of a lower gear in the event the sensed engine speed comprises less than a preselected percentage of a predetermined no-load engine speed at the sensed throttle position. That is, the transmission controller 10 and, in particular, the microcomputer 90 responds to the throttle position signals received from the potentiometer 46 and the engine rpm signals received from the engine speed sensor 40 for developing a gear selection control signal for selecting a different and lower gear should the engine rpm fall below the percentage of no-load rpm set by the auto downshift control 48; i.e., a predetermined and preprogrammed no-load value of engine rpm for the current throttle position.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A transmission control system with automatic gear reduction for use in a vehicle having an engine operable at varying engine speeds, a transmission with an input shaft and a plurality of output gears, each with a selected ratio of reduction relative to the input shaft, manual gear shift selector means for providing a shift position corresponding to a selected one of said plurality of gears, manual throttle control means for selecting a throttle position, said transmission control system comprising:

transmission control means for providing an output signal to select one of said plurality of gears;

gear shift selector sensing means for sensing said shift position and providing a first sensing signal to said transmission control means;

engine speed sensing means for sensing the engine speed of the vehicle and providing a second sensing signal to said transmission control means;

throttle sensing means for sensing the throttle position and for providing a third sensing signal to said transmission control means;

manually adjustable downshift control means for selecting a downshift control position corresponding to a percentage of n-load engine speed at a desired throttle position; and downshift control sensing means for sensing said downshift control position and for providing a fourth sensing signal to said transmission control means, said transmission control means, upon the receipt of said gear shift selector sensing signal, said engine speed sensing signal, said throttle position sensing signal, and said downshift control sensing signal, comparing said engine speed signal with said downshift control signal and providing said output signal to select a reduced gear ratio when said engine speed signal is less than said downshift control signal for the sensed throttle position.

2. The transmission control system of claim 1 wherein said manual gear selector means includes a "forward" position and a "neutral" position, said control system further comprising:

display means for providing indicia corresponding to an engaged one of said gears when said gear selector means is in the "forward" position, said display means providing indicia corresponding to one of said gears that will be engaged when the selector means is moved from the "neutral" position to the "forward" position while said gear selector means is in the "neutral" position.

* * * * *